United States Patent
Takahashi (10) Patent No.: US 9,557,474 B2
(45) Date of Patent: Jan. 31, 2017

(54) LIGHT GUIDE AND IMAGE READING APPARATUS

(71) Applicant: CANON KABUSHIKI KAISHA, Tokyo (JP)

(72) Inventor: Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/900,409

(22) Filed: May 22, 2013

(65) Prior Publication Data

US 2013/0321879 A1      Dec. 5, 2013

(30) Foreign Application Priority Data

May 31, 2012   (JP) ................ 2012-124998

(51) Int. Cl.
*H04N 1/04* (2006.01)
*F21V 8/00* (2006.01)
*H04N 1/028* (2006.01)

(52) U.S. Cl.
CPC ........ *G02B 6/0088* (2013.01); *H04N 1/02855* (2013.01)

(58) Field of Classification Search
CPC ................ H04N 1/002855; G02B 6/0088
See application file for complete search history.

(56) References Cited

U.S. PATENT DOCUMENTS

| | | | |
|---|---|---|---|
| 7,717,598 B2 * | 5/2010 | Kakizaki et al. | 362/551 |
| 7,903,298 B2 * | 3/2011 | Sawada et al. | 358/484 |
| 8,194,294 B2 * | 6/2012 | Tagawa et al. | 358/475 |
| 8,325,392 B2 * | 12/2012 | Tagawa et al. | 358/475 |
| 2009/0080213 A1 * | 3/2009 | Onishi | G02B 6/001 362/551 |
| 2009/0290199 A1 | 11/2009 | Tagawa et al. | |
| 2010/0232834 A1 | 9/2010 | Ishida | |
| 2011/0228353 A1 * | 9/2011 | Okamoto | H04N 1/02815 358/475 |
| 2013/0070312 A1 * | 3/2013 | Saiga | 358/474 |
| 2013/0083369 A1 * | 4/2013 | Mitsutake et al. | 358/474 |
| 2013/0100476 A1 * | 4/2013 | Fukuma | H04N 1/0282 358/1.13 |
| 2013/0135859 A1 * | 5/2013 | Inoue | G02B 6/0011 362/235 |
| 2013/0321879 A1 * | 12/2013 | Takahashi | 358/474 |

FOREIGN PATENT DOCUMENTS

| | | |
|---|---|---|
| CN | 101182914 A | 5/2008 |
| CN | 101385327 A | 3/2009 |
| CN | 101867676 A | 10/2010 |
| JP | H10-276296 A | 10/1998 |

(Continued)

*Primary Examiner* — Cheukfan Lee
(74) *Attorney, Agent, or Firm* — Canon USA Inc., IP Division (57) ABSTRACT

A light guide includes an incidence surface configured to allow light from a light emitting unit to enter the light guide, a light guide portion configured to propagate the light entering via the incidence surface, a reflection portion configured to reflect the propagated light, an exit surface configured to allow light reflected on the reflection portion to exit, and a protrusion portion configured to position the light guide, wherein the protrusion portion is provided downstream of the reflection portion.

10 Claims, 11 Drawing Sheets

(56) References Cited

FOREIGN PATENT DOCUMENTS

| JP | 2007-221360 A | | 8/2007 |
|---|---|---|---|
| JP | 2007201845 A | * | 8/2007 |
| JP | 2007221359 A | * | 8/2007 |
| JP | 2010-217418 A | | 9/2010 |
| JP | 2011-004289 A | | 1/2011 |

* cited by examiner

LEAKAGE OF
LIGHT FLUX

LIGHT GUIDE AND IMAGE READING APPARATUS

BACKGROUND OF THE INVENTION

Field of the Invention

The present invention relates to a light guide including a protrusion portion for alignment and an image reading apparatus including the light guide.

Description of the Related Art

An image reading apparatus which uses an illumination unit including a light-emitting diode (LED) light source and a light guide element is known. Conventionally, as the illumination unit, configurations illustrated in FIGS. 8A and 8B and 9 have been known.

Figure 8A:
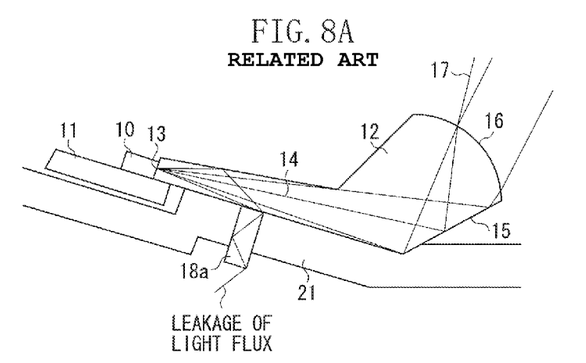
FIGS. 8A and 8B are a cross-sectional view and a top view illustrating a light guide according to the related art, respectively.
Figure 8B:
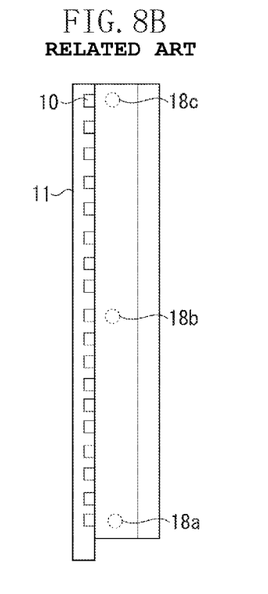
Figure 9:
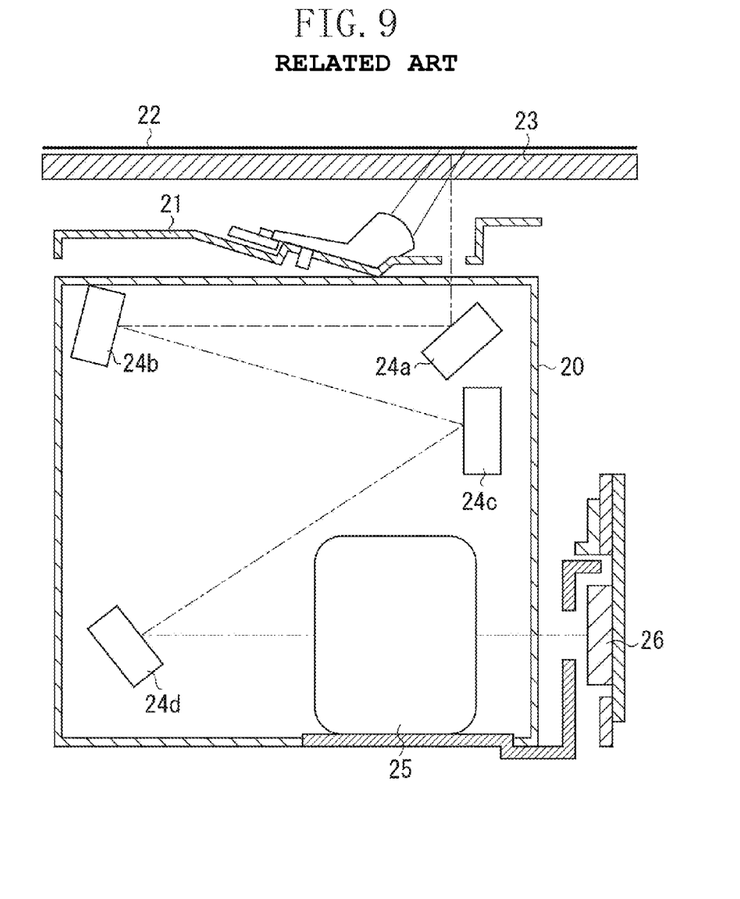
FIG. 9 is a cross-sectional view illustrating an optical unit according to the related art.

A plurality of LED elements 10 is disposed on an LED substrate 11 in a line. A light guide element 12 is fixed to the LED substrate 11 on which the plurality of LED elements 10 is mounted. Further, the light guide element 12 is aligned by positioning bosses 18a, 18b, and 18c, which are provided on a bottom surface of the light guide element, and fixed to a housing member 21 which is formed above an optical unit 20.

Light emitted from the LED element 10 is propagated through the light guide element 12 and irradiates a document 22 on a document positioning glass 23. Reflected light from the document 22 is guided to an imaging unit 25 by folding mirrors 24a, 24b, 24c, and 24d which are held in the optical unit 20. Further, an image of the document is formed on a solid-state image sensor 26 by the imaging unit 25. The solid-state image sensor 26 photoelectrically converts incident light reflected from the document and outputs image data which indicates the image of the document. The optical unit 20 moves in a reader unit to read an image of the entire document.

As discussed in U.S. Patent Application Publication No. 2010/0232834, the alignment of the light guide element is performed by fitting a plurality of positioning bosses provided on the bottom surface of the light guide element into fitting holes provided in the housing member.

Figure 10:
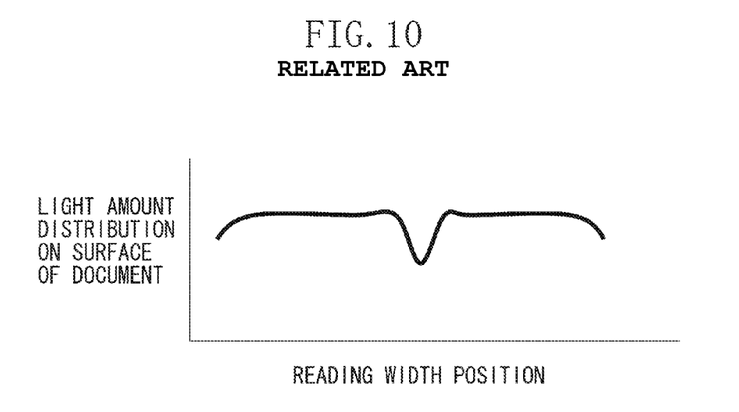
FIG. 10 is a diagram illustrating an illumination distribution when the light guide according to the related art is used.

In a device including a configuration illustrated in FIGS. 8A and 8B and 9, most of light flux incident from the LED element 10 to the light guide element 12 is propagated through a light guide portion 14, is deflected by a reflection portion 15, and then exits toward the document 22. However, in the positioning bosses 18a, 18b, and 18c provided on the bottom surface of the light guide element, the propagated light flux is not totally reflected and a part of the light flux is leaked from the positioning bosses. As a result, as illustrated in FIG. 10, the distribution of the light amount in a reading width direction is not uniform.

In a light guide element discussed in U.S. Patent Application Publication No. 2010/0232834, the positioning bosses are disposed between an LED element and an LED element in a longitudinal direction of the light guide element 12. In other words, the positioning bosses of the light guide element are provided in a portion where the light flux is sparse in the longitudinal direction. With this configuration, the leakage of the light from the positioning bosses is reduced. However, it is required to further reduce the leakage of the light from the positioning bosses. Further, since the positions of the positioning bosses depend on the positions of the LED elements, each time the number or the arrangement of LED elements is changed, the light guide element needs to be newly created, which increases the cost.

Figure 11:
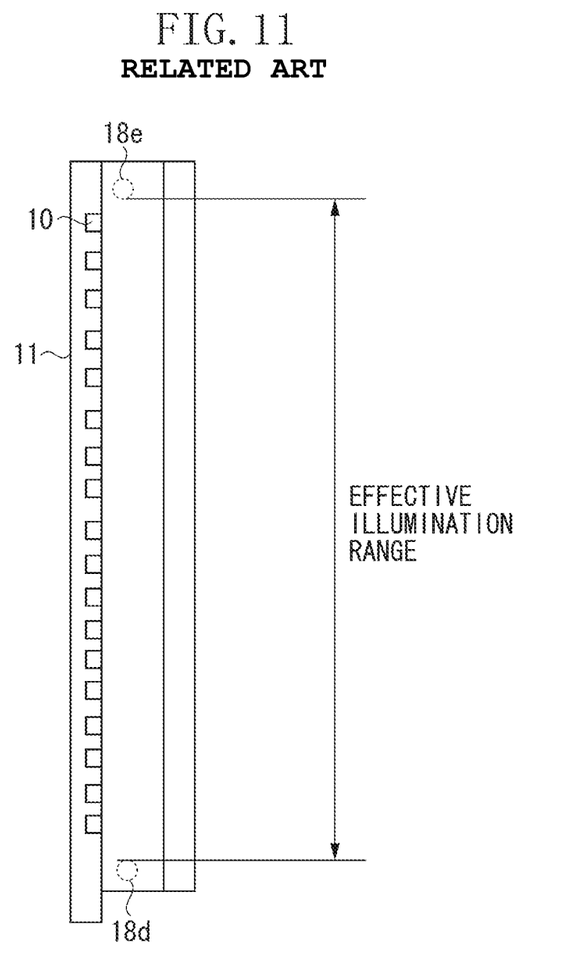
FIG. 11 is a top view illustrating the light guide according to the related art.

Further, as a measure for preventing the non-uniform distribution of the light amount due to the leakage of the light flux from the positioning bosses, as illustrated in FIG. 11, a measure for providing the positioning bosses outside effective ranges 108d and 108e of the light guide element is considered. However, when the above-mentioned method is used, the entire length of the light guide element is increased, which is an obstacle to reduction in the size of the device.

SUMMARY OF THE INVENTION

According to an aspect of the present invention, a light guide includes an incidence surface configured to allow light from a light emitting unit to enter the light guide, a light guide portion configured to propagate the light entering via the incidence surface, a reflection portion configured to reflect the propagated light, an exit surface configured to allow light reflected on the reflection portion to exit, and a protrusion portion configured to position the light guide, wherein the protrusion portion is provided downstream of the reflection portion.

Further features of the present invention will become apparent from the following description of exemplary embodiments with reference to the attached drawings.

DESCRIPTION OF THE EMBODIMENTS

Figure 1:
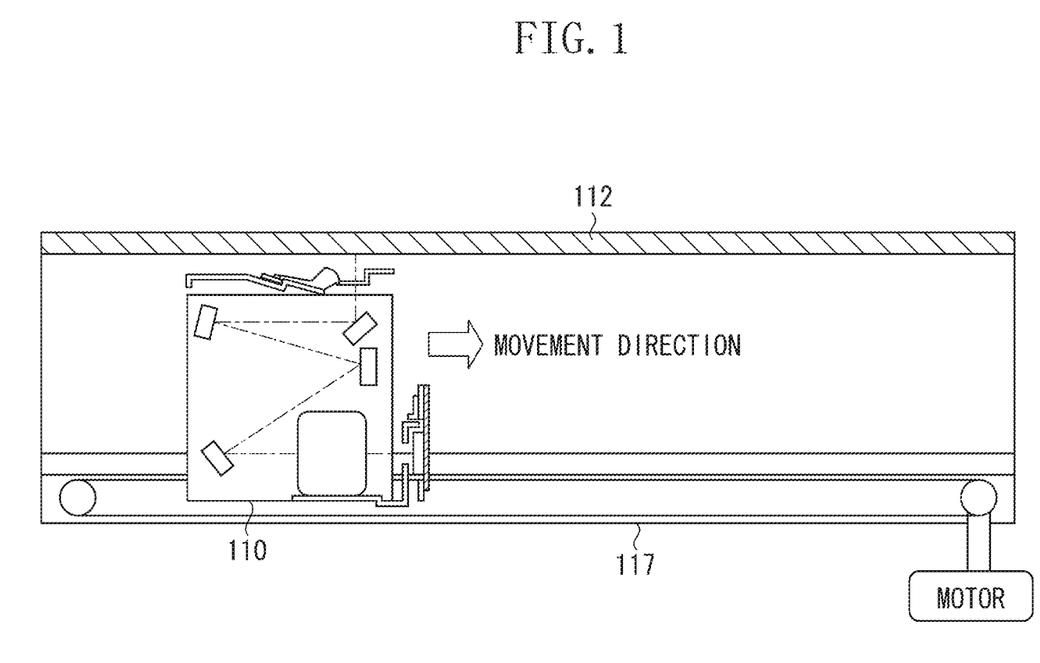
FIG. 1 is a cross-sectional view illustrating an image reading apparatus.
Figure 2:
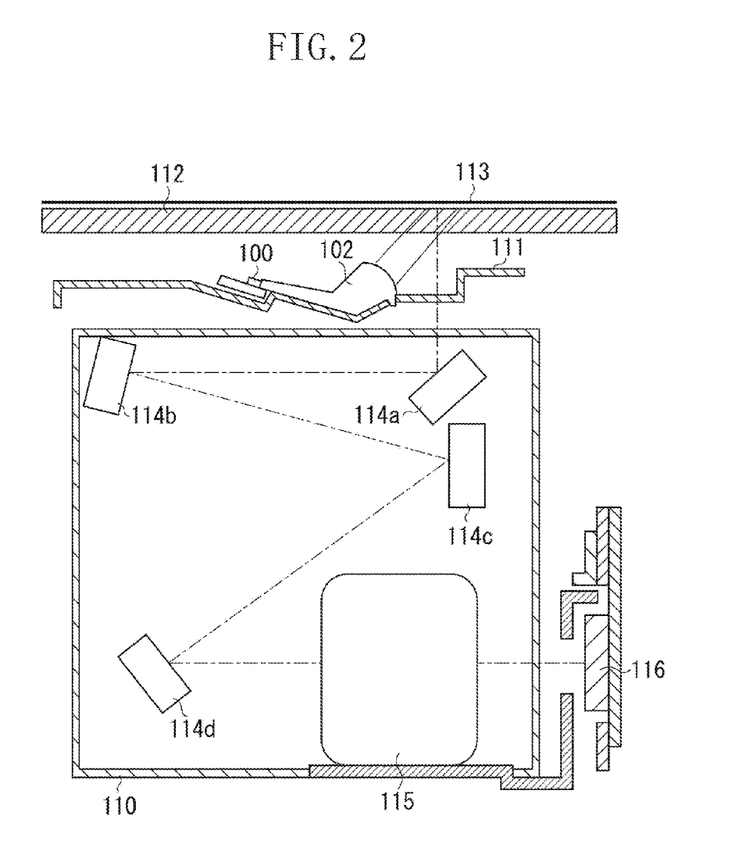
FIG. 2 is a cross-sectional view illustrating an optical unit.

Hereinafter, a first exemplary embodiment will be described. FIG. 1 is a cross-sectional view illustrating an image reading apparatus according to the exemplary embodiment. FIG. 2 is a cross-sectional view illustrating an optical unit 110 in the image reading apparatus.

The optical unit 110 moves inside a reader unit 117 in a movement direction by a belt which is driven by a motor. The optical unit 110 reads a document which is placed on a document positioning plate 112 while moving in the movement direction.

A configuration of the optical unit 110 will be described. An illumination unit, which includes LED elements (light emitting elements) 100 and a light guide 102, is fixed to a housing member 111, which is fixed above the optical unit 110. A light flux emitted from the LED elements 100 is propagated through the light guide 102 to exit toward a document 113. The optical unit 110 holds folding mirrors 114a, 114b, 114c, and 114d, an imaging unit 115, and a solid-state image sensor 116 in a frame member. Reflected light from the document 113 is guided to the imaging unit 115 (a lens unit) by the folding mirrors 114a, 114b, 114c, and 114d which are held in the frame member of the optical unit 110. Further, an image of the document is formed on the solid-state image sensor 116 by the imaging unit 115. The solid-state image sensor 116 receives the incident light from the document and outputs an image signal, which indicates the image of the document.

Figure 3:
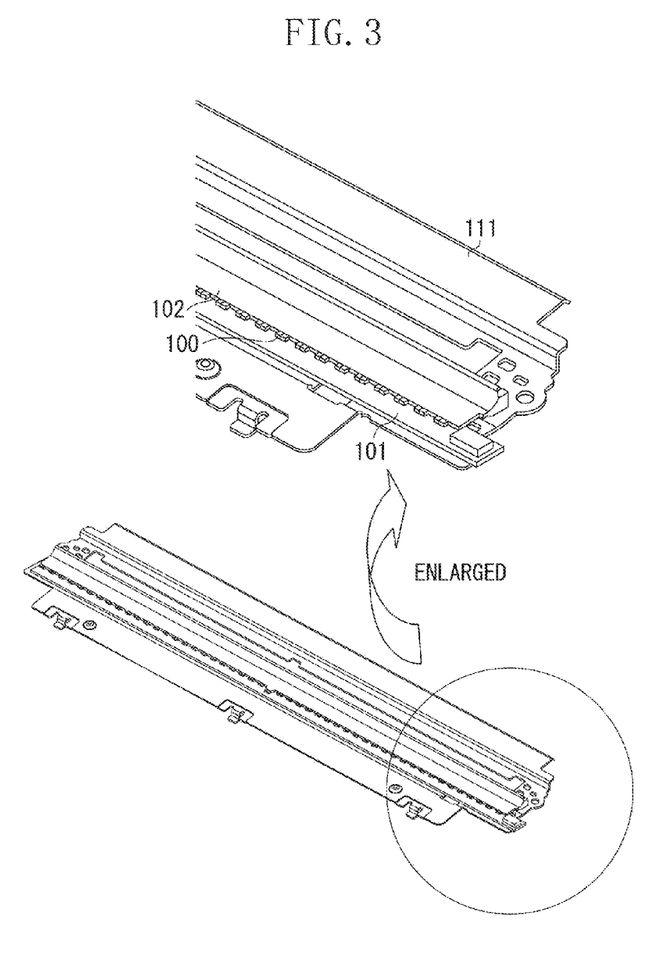
FIG. 3 is a perspective view illustrating an illumination unit.
Figure 4:
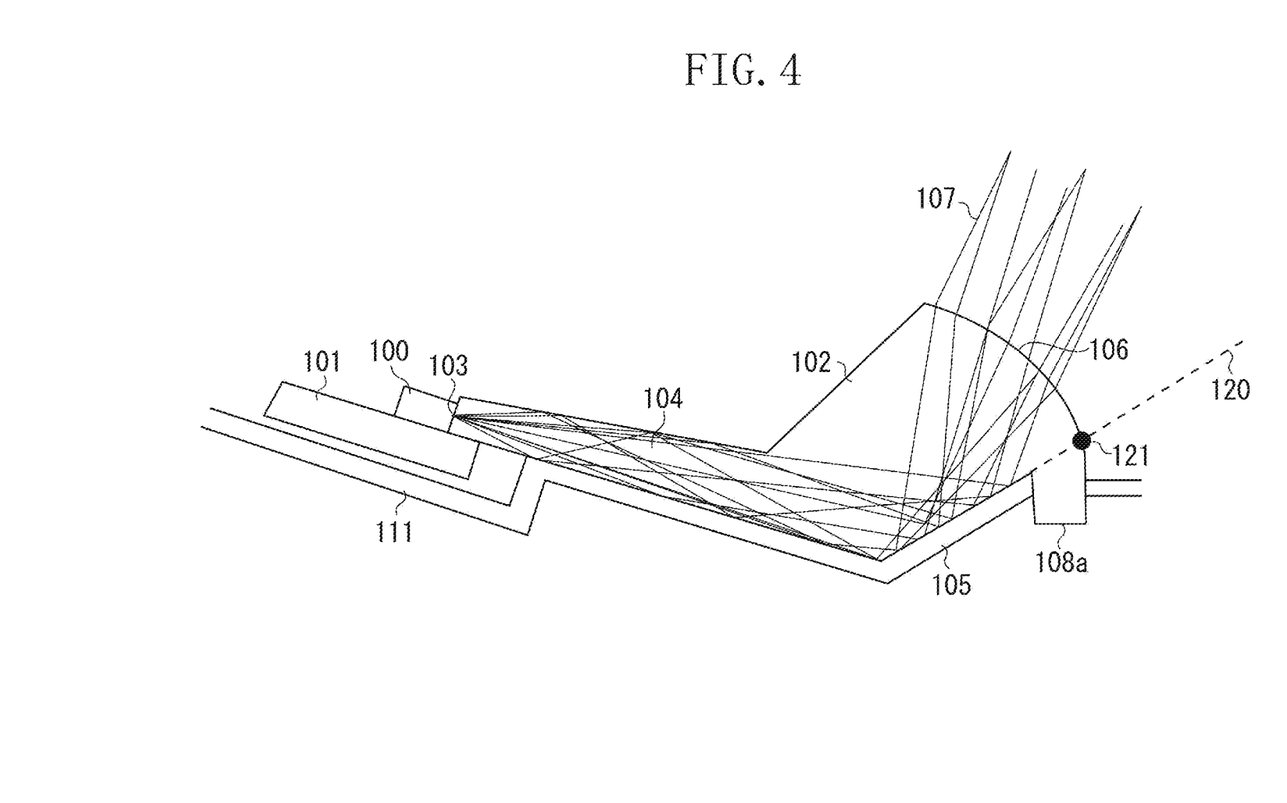
FIG. 4 is a cross-sectional view illustrating the illumination unit.
Figure 5:
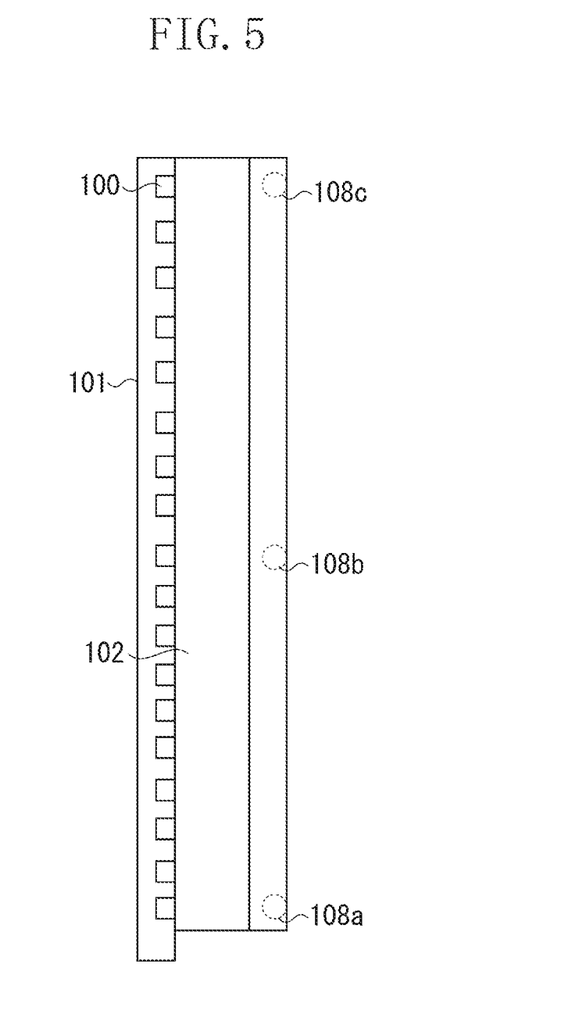
FIG. 5 is a top view illustrating the illumination unit.

FIG. 3 is a perspective view illustrating the illumination unit according to the exemplary embodiment. FIGS. 4 and 5 are a cross-sectional view and a top view illustrating the illumination unit according to the exemplary embodiment, respectively.

A plurality of side-irradiating type LED elements 100 is mounted on an LED substrate 101 in a line. The light guide 102 is formed of an acrylic resin. Further, the light guide 102 is fixed onto the LED substrate 101 such that an emission surface of each of the plurality of LED elements 100 is opposite and adjacent to an incidence surface 103 of the light guide 102. In the exemplary embodiment, the light guide 102 is fixed onto the LED substrate 101 using a double-sided tape. Further, a member, which includes the LED elements 100, the LED substrate 101, and the light guide 102, is fixed to the housing member 111. A fixing position of the member, which includes the LED elements 100, the LED substrate 101, and the light guide 102, is determined by fitting a positioning boss 108 of the light guide 102 into a fitting hole of the housing member 111. In the present exemplary embodiment, the housing member 111 is formed by bending a plate.

The light flux emitted from the LED element 100 is incident from the incidence surface 103 of the light guide 102 onto the light guide 102, and propagated through a light guide portion 104 of the light guide 102. Further, the light flux, which is propagated through the light guide portion 104, is reflected on a reflection portion 105 provided downstream of the light guide 102, deflected in a direction of the document 113, and exits from an exit surface 106. The exiting light flux 107 linearly irradiates the document 113.

A position of the positioning boss in the light guide 102 will be described in detail. The positioning boss according to the exemplary embodiment includes a protrusion portion which protrudes from the light guide.

To reduce the leakage of the light flux from the positioning boss 108, the positioning boss 108 is provided downstream of the reflection portion 105 where the light flux is sparse. Further, the positioning boss 108 is provided outside an outermost line of a main light flux. In addition, as illustrated in FIG. 4, the positioning boss 108 is adjacent to the exit surface 106, and provided on the exit surface in an outer direction of the main light flux which is further than an intersection 121 of a surface 120 (a surface defined by a reflection surface), in which the reflection surface of the reflection portion 105 downwardly extends, and the exit surface 106. In other words, the position of the positioning boss 108 is outside the outermost line of the main light flux which is reflected on the reflection surface 120, and outside the outermost line of the main light flux exiting from the exit surface 106. Further, the positioning boss 108 protrudes toward an opposite side of a center of the exit surface 106 with respect to the intersection 121 of the surface 120 defined by the reflection surface of the reflection portion and the exit surface 106.

As described above, a portion of the positioning boss 108 is a shadow of the surface 120 and thus the leakage of the light flux from the positioning boss 108 may be reduced. To dispose the positioning boss 108 most downstream of the reflection portion 105, as illustrated in FIG. 4, the positioning boss 108 is disposed adjacent to the exit surface 106. However, the positioning boss 108 does not need to be disposed adjacent to the exit surface 106 as long as the positioning boss 108 is disposed outside the outermost line of the main light flux exiting from the exit surface 106.

Figure 6:
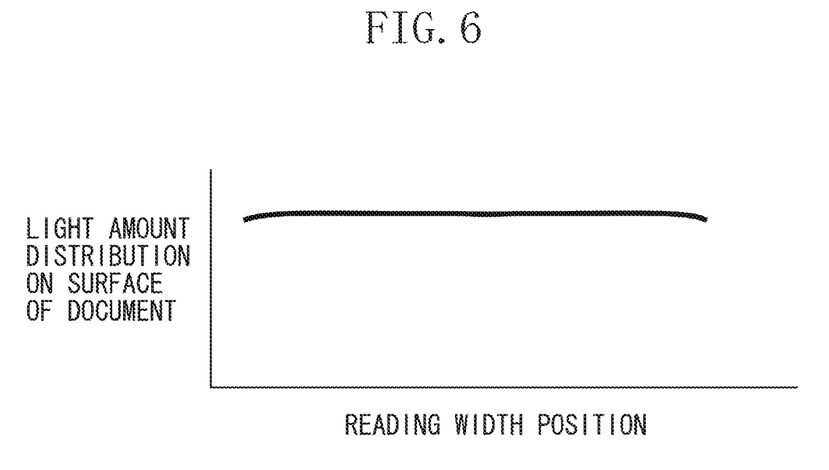
FIG. 6 is a diagram illustrating an illumination distribution when a light guide is used.

FIG. 6 illustrates a light amount distribution in a reading width direction when the light guide according to the exemplary embodiment is used. It can be understood that the non-uniform light amount distribution in a reading width direction occurring in the light guide according to the related art, which is illustrated in FIG. 10, is improved in the apparatus according to the exemplary embodiment. According to the light guide of the exemplary embodiment, the light flux leaked from the positioning boss 108 may be reduced to 2% or less and an influence of the positioning boss on the illumination distribution may be reduced.

A structure of the light guide 102 in a cross-section perpendicular to a longitudinal direction is similar to a structure at any position in the longitudinal direction. In other words, a portion where the light flux is sparse is present at the similar position in any cross-section of the light guide. Therefore, the positioning boss may be provided at an arbitrary position in the longitudinal direction of the light guide. In other words, within an effective illumination range in the longitudinal direction of the light guide, regardless of the position of the LED element 100, the positioning boss may be provided at an arbitrary position in the longitudinal direction of the light guide. In the exemplary embodiment, as illustrated in FIG. 5, the positioning boss is provided at three locations of 108a, 108b, and 108c in the longitudinal direction of the light guide 102. Therefore, like the light guide illustrated in FIG. 11, the light guide does not need to be elongated to dispose the positioning boss. Further, it is not necessary to determine the position of the positioning boss based on the position of the LED elements unlike the light guide discussed in U.S. Patent Application Publication No. 2010/0232834, nor is it necessary to newly create a light guide even when the arrangement of the LED elements is changed.

A modification example of the light guide according to the first exemplary embodiment will be described. Since the configuration other than the light guide is similar, the description of the similar configuration will not be repeated.

Figure 7:
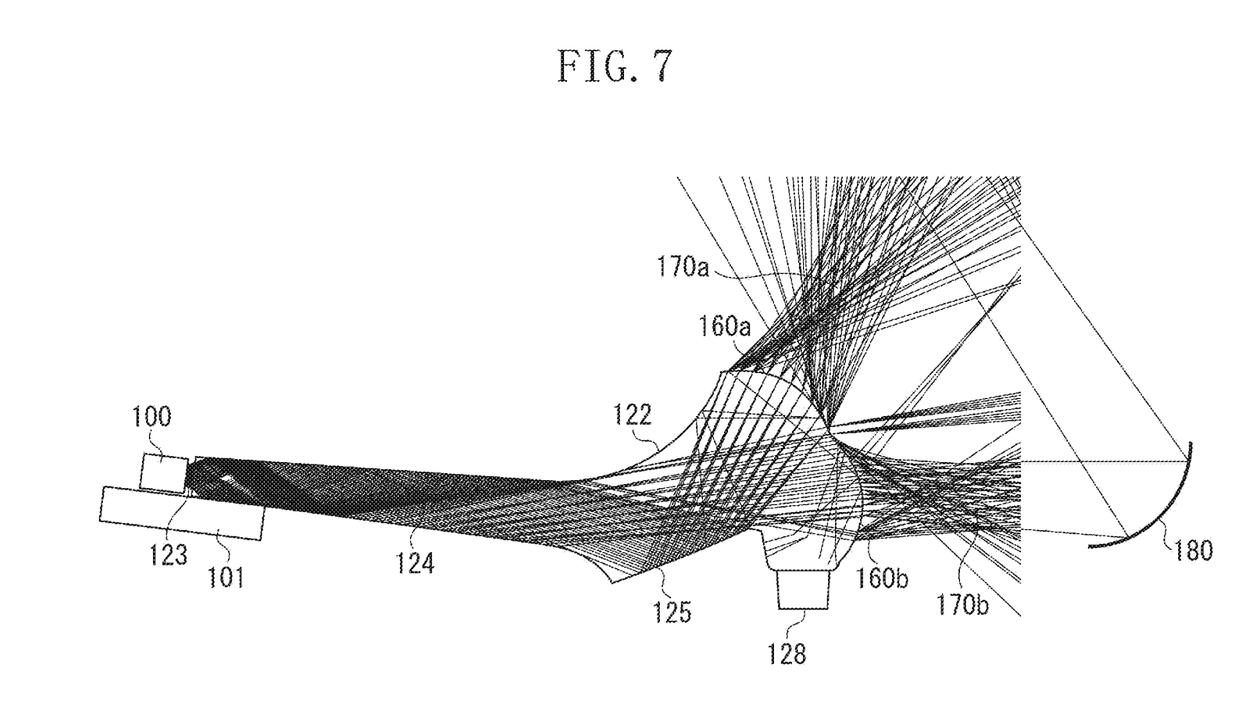
FIG. 7 is a cross-sectional view illustrating an illumination unit according to a modification example.

FIG. 7 is a cross-sectional view illustrating the light guide according to the modification example. A light guide 122 illustrated in FIG. 7 includes two exit surfaces 160a and 160b.

A light flux emitted from the LED element 100 is incident from an incidence surface 123 of the light guide 122 onto the light guide 122, and propagated through a light guide portion 124 of the light guide 122. The light flux which is propagated through the light guide portion 124 is split into two light fluxes. One light flux 170a is reflected on a reflection portion 125, which is provided downstream of the light guide 122, deflected in a direction of a document 113, and then exits from the exit surface 160a. The other light flux 170b exits from the exit surface 160b without being reflected on the reflection portion 125. The light flux 170a linearly irradiates the document 113 as it is. In the meantime, the light flux 170b is reflected on a reflecting plate 180 to irradiate the document 113. A direction of the light flux 170a which irradiates the document 113 and a direction of the light flux 170b which irradiates the document 113 are different from each other.

A positioning boss 128 of the light guide 122 is provided further outside than the outermost line of a main light flux which is propagated through the light guide portion 124 without being reflected on the reflection portion 125, on the exit surface 160b. Further, the positioning boss 128 is disposed downstream of the reflection surface of the reflection portion 125. In addition, the positioning boss 128 is disposed outside the outermost line of the main light flux which is reflected on the reflection portion 125, on the reflection surface of the reflection portion 125. A position where the positioning boss 128 is provided corresponds to a shadow of the reflection portion 125 of the light guide 122 and is a portion where a light flux is sparse. In other words, the light fluxes, which reach the positioning boss, in two directions are very small. Therefore, by providing the positioning boss 128 in the above-described portion, it is possible to reduce the leakage of the light flux from the positioning boss and not to affect the illumination distribution of illumination light. Further, a portion of the light guide 122 where the light flux is sparse is also present at the similar position in any cross-section of the light guide. Therefore, the positioning boss may be provided at an arbitrary position in the longitudinal direction of the light guide.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-124998 filed May 31, 2012, which is hereby incorporated by reference herein in its entirety.

What is claimed is:

1. A light guide comprising:
an incidence surface on which light from a light emitting unit is incident;
a light guide portion configured to propagate the light being incident via the incidence surface;
a reflection portion configured to reflect the light propagated by the light guide portion toward an exit surface;
the exit surface from which the light reflected on the reflection portion exits; and
a protrusion portion which is provided downstream of the reflection portion outside outermost lines of a main light flux,
wherein the protrusion portion is provided so as to be positioned at a predetermined position of another member,
wherein a plane defined by a surface of the light guide portion and a plane defined by a reflection surface of the reflection portion intersect.

2. The light guide according to claim 1, wherein a portion downstream of the reflection portion, in which the protrusion portion is provided, is a portion where a light flux to be propagated is sparse.

3. The light guide according to claim 1, wherein the protrusion portion protrudes toward an opposite side of a center of the exit surface with respect to an intersection of a plane defined by the reflection surface of the reflection portion and the exit surface.

4. The light guide according to claim 1, wherein the protrusion portion is provided within an effective range in a longitudinal direction of the light guide.

5. The light guide according to claim 1, wherein the protrusion portion is provided on a portion, which is adjacent to the exit surface, in the reflection portion.

6. An image reading apparatus comprising:
the light guide according to claim 1;
a portion configured to receive light reflected from a document, which is illuminated by light exiting from the light guide;
a frame member configured to hold a reading unit; and
a housing member to which the light guide is fixed and which is fixed to the frame member,
wherein the light guide is positioned with respect to the housing member by the protrusion portion of the light guide.

7. The image reading apparatus according to claim 6,
wherein the another member is the housing member,
wherein the protrusion portion is fitted into a fitting hole of the housing member.

8. A light guide comprising:
an incidence surface on which light from a light emitting unit is incident;
a light guide portion configured to propagate the light being incident via the incidence surface;
a reflection portion configured to reflect the light propagated by the light guide portion toward an exit surface;
the exit surface from which the light reflected on the reflection portion exits; and
a protrusion portion which is provided downstream of the reflection portion outside outermost lines of a main light flux,
wherein the protrusion portion is provided so as to be positioned at a predetermined position of another member,
wherein a plane defined by a surface of the light guide portion and a plane defined by a reflection surface of the reflection portion intersect,
wherein the exit surface includes first and second exit surfaces,
wherein light exiting from the first exit surface is light reflected on the reflection portion, and
wherein light exiting from the second exit surface is light which is not reflected on the reflection portion, and
wherein the protrusion portion is provided in a portion where a shadow of the reflection portion is formed.

9. An image reading apparatus comprising:
the light guide according to claim 8;
a portion configured to receive light reflected from a document, which is illuminated by light exiting from the light guide;
a frame member configured to hold a reading unit; and
a housing member to which the light guide is fixed and which is fixed to the frame member,
wherein the light guide is positioned with respect to the housing member by the protrusion portion of the light guide.

10. The light guide according to claim 8, wherein the protrusion portion is provided within an effective range in a longitudinal direction of the light guide.

* * * * *